United States Patent [19]

Legris

[11] Patent Number: 4,469,338
[45] Date of Patent: Sep. 4, 1984

[54] GASKET DISPOSED BETWEEN AN APPARATUS AND A THREADED COUPLING FOR PIPE CONVEYING HIGH PRESSURE FLUID

[75] Inventor: André Legris, Saint-Maur, France

[73] Assignee: Legris, Rennes, France

[21] Appl. No.: 476,491

[22] Filed: Mar. 18, 1983

[30] Foreign Application Priority Data

Apr. 8, 1982 [FR] France ................. 82 06187

[51] Int. Cl.³ ............... F16L 15/04; F16J 15/08
[52] U.S. Cl. ................... 277/236; 277/188 A; 277/207 A; 285/329
[58] Field of Search ........... 277/188 R, 188 A, 207 R, 277/207 A, 207 B, 236; 285/329, 378, DIG. 18

[56] References Cited

U.S. PATENT DOCUMENTS

| | | | |
|---|---|---|---|
| 115,463 | 5/1871 | Hall et al. | 277/236 |
| 3,186,743 | 6/1965 | Russell | 277/236 X |
| 3,437,357 | 4/1969 | Rubin | 285/329 X |
| 3,446,508 | 5/1969 | Mayer | 277/236 X |
| 3,891,246 | 6/1975 | Hopper | 285/DIG. 18 X |
| 3,895,831 | 7/1975 | Fisher | 285/DIG. 18 X |

*Primary Examiner*—Robert S. Ward
*Attorney, Agent, or Firm*—Bucknam and Archer

[57] ABSTRACT

A gasket disposed between a coupling for a pipe conveying high pressure fluid and an apparatus presenting a tapped hole in which the threaded part of the coupling is screwed, said gasket comprising a hoop made of hard, resistant material bearing by one of its two faces against the wall of the apparatus and presenting a bore in which are engaged, around the coupling, a seal member made of creepable, malleable material and a ring to be crimped made of ductile material having a wedge-shaped cross section, said ring being crimped inside the hoop when the coupling is screwed. The invention provides tightness of couplings screwed on an apparatus.

16 Claims, 29 Drawing Figures

GASKET DISPOSED BETWEEN AN APPARATUS AND A THREADED COUPLING FOR PIPE CONVEYING HIGH PRESSURE FLUID

The present invention relates to a gasket or sealing construction disposed between a coupling and the apparatus on which said coupling is screwed, especially for fluid circuits in general and for high pressure hydraulic control circuits in particular.

Couplings for high pressure hydraulic fluid are always screwed on the apparatus and, despite research made in this domain, the tightness of the screwed members has never been able to be mastered, with the result that the leaks of liquid present serious drawbacks both from the financial point of view and from the standpoint of the damage caused by said leaks. It has been observed that half of the leaks in hydraulic control installations is attributable to the implantation of the couplings by screwing. All large firms, and particularly those in the automobile industry, encounter this difficulty and question the use of hydraulic control which, however, is very important. For one single firm, the losses of liquid may amount to nearly two million liters of oil which must be replaced and of which the price is always increasing.

Furthermore, all the cutting oils for machining must be replaced often, as they are polluted by these oil leaks. Finally, the concrete floors of the buildings are degraded by the oil which spreads over them and they no longer support the load of the assembly or machining lines; consequently, in certain cases, it is necessary to demolish and reconstruct them. To palliate these drawbacks, cleaning and maintenance staff are made available, who clean the floor, clean and empty the tanks of cutting oil of the machining apparatus, and tighten the couplings to eliminate the losses of liquid as much as possible. However, these leaks are very difficult to detect since they take the form of a drip-by-drip ooze.

The high pressures and in particular the very rapid cycles of present-day machines, as well as the vibrations, communicate very violent pressure jolts which shake the threaded implantations of the couplings, creating micro-bruising of the metal parts in contact, as well as micro-clearances, which give passage to very pernicious oozing of oil. The cause of these oil leaks lies in the fact that the gaskets do not provide an absolute tightness of the threaded implantations of couplings. Such a gasket must comply with the conditions of use as mentioned hereinafter.

The threaded coupling with its gasket must be tight from zero pressure to a trial pressure of 600 bars. The gaskets must provide tightness with the maximum of existing forms of couplings and threaded implantations. The gasket must tolerate machining defects of the threaded implantation and must compensate such shortcomings. The gasket must be able to support, without deterioration, four or five operations of dismounting and reassembly of the coupling on the apparatus. The gasket must be able to withstand a temperature of 100° C. continuously. The operating pressure of the hydraulic circuit is between 0 and 400 bars. The gaskets must withstand the hydraulic control fluids such as petroleum products, a mixture of water and glycol, and also bought non-inflammable fluids. The tightness must last about 20,000 machine hours or ten years of age and about five million cycles.

Assembly must be effected by non-specialised personnel whose period of adaptation is only a few hours.

The gasket according to the invention is a universal seal which is capable of ensuring tightness of numerous types of threaded implantations of couplings.

The above-mentioned difficulties in obtaining a complete seal have given rise to numerous implantations of couplings, but virtually without any success. They are tight only if all the conditions of maximum quality of machining are combined, which, in the best of cases, could not exceed between 80 and 90% in such productions. At least 20 to 10% of coupling implantations with leaks must therefore be expected.

Figure 1:
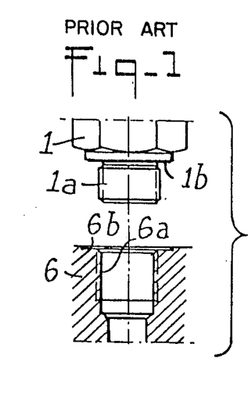
FIGS. 1 to 9 are views in elevation of the assembly of threaded couplings on apparatus with sealing means of known type.
Figure 1A:
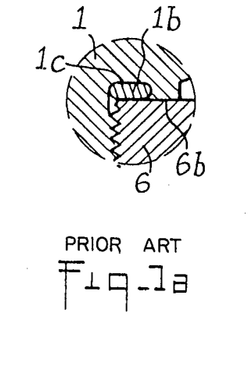

FIGS. 1 and 1a of the accompanying drawings show a coupling 1 of which threaded cylindrical part 1a is screwed in a cylindrical tapped hole 6a in the body 6 of an apparatus. An O-ring 1b made of rubber is disposed in an annular housing 1c in the coupling 1. When machining is perfect, the device is tight, as the seal is well enclosed. However, this device does not tolerate any out-of-square of the face 6b (extrusion of the seal through the space left free by the clearance), a poor state of the surface 6b, particularly small scratches which cause oozing, fluids which are unsuited to rubber, temperatures higher than 100° C.

Figure 2:
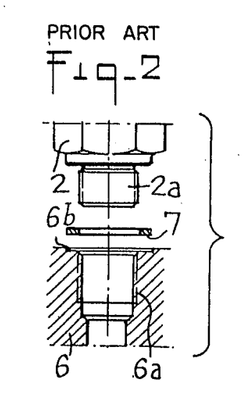
Figure 2A:
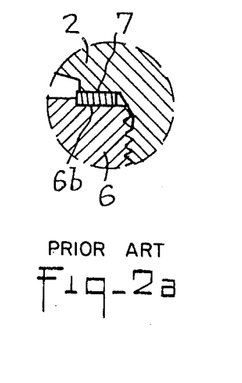

FIGS. 2 and 2a show a coupling 2 of which the threaded cylindrical part 2a is screwed in a tapped cylindrical hole 6a and a copper seal 7 is gripped flat between the coupling 2 and the flat housing 6b. This simple device does not tolerate any out-of-square which provokes a leak, too rough a state of surface 6b, a countersink 6b different from the outer diameter of the seal, the absence of a countersink. The copper seal must be held by its outer diameter to resist the pressure.

Figure 3:
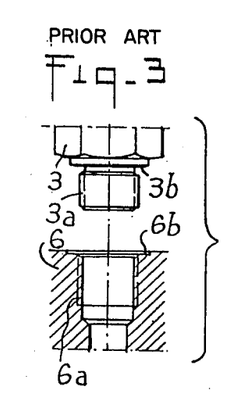
Figure 3A:
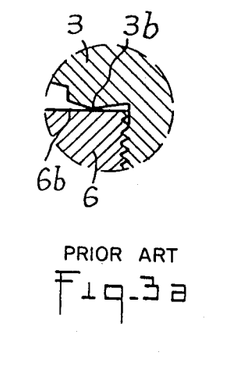

FIGS. 3 and 3a show a coupling 3 of which the threaded cylindrical part 3a is screwed in a tapped hole 6a. The coupling comprises a peripheral edge 3b which constitutes a metal bearing surface bearing on the face 6b. This device does not tolerate any out-of-square of the face 6b (even slight) without risk of leaks, a poor state of the surface 6b, blows or marks on the edge 3b.

Figure 4:
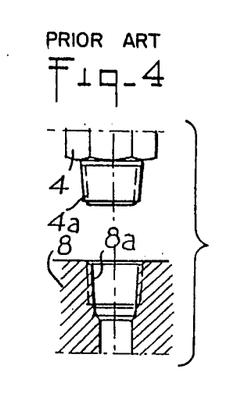
Figure 4A:
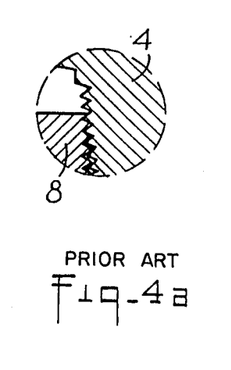

FIGS. 4 and 4a show a coupling 4 of which the conical threaded part 4a is screwed with radial tightening in a cylindrical tapped hole 8a. Tightness is obtained by means of a fine seal constituted by a ribbon of plastics material placed between the thread and the tapping or with the aid of a glue constituting a special seal. The plastics material does not hold and it is extruded by the high pressures. Finally, the special glue is not totally efficient as its distribution on the thread is not equal over the whole periphery.

Figure 5:
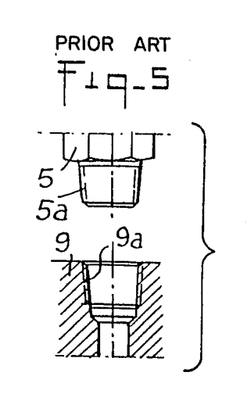
Figure 5A:
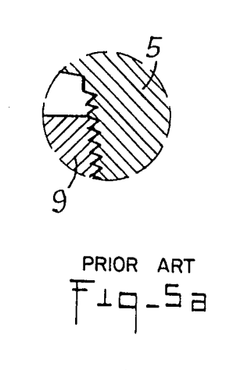

FIGS. 5 and 5a show a coupling presenting a conical threaded part 5a which is screwed in a conical tapped hole 9a. Tightness is obtained by means of a fine ribbon of plastics material disposed between the thread and the tapping, by means of a glue or without intermediate means, but always with strong tightening. However, the apparatus do not always withstand such a tightening and sometimes split.

Figure 6:
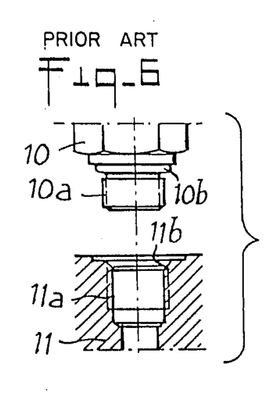
Figure 6A:
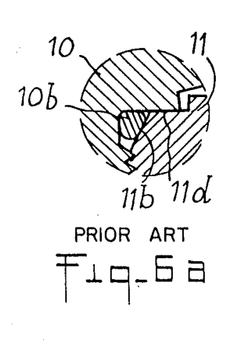

FIGS. 6 and 6a show a coupling 10 presenting a cylindrical threaded part 10a which is screwed in a cylindrical tapped hole 11a, tightness being ensured by an O-ring 10b made of rubber captive between a groove in the coupling and a conical part 11b of the apparatus 11. This device does not tolerate any out-of-square of the face 11d, a poor surface state (scratches) of the conical part 11b, fluids unsuited to rubber, too high pressures and temperatures higher than 100° C.

Figure 7:
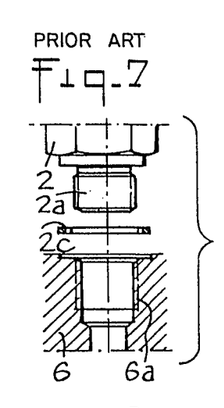
Figure 7A:
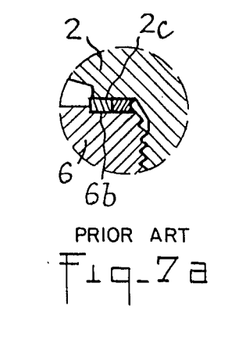

FIGS. 7 and 7a show a coupling whose assembly is identical to that of FIG. 2, only the seal being different. In this case, the seal is composite and comprises a steel washer in whose bore adheres a rubber seal whose lips bear on the coupling and on the face 6b. These seals are well known in hydraulics; however, this device does not tolerate any out-of-square of the face 6b, a poor surface state (scratches) of the face 6b, high pressures, fluids not suited to rubber and temperatures higher than 100° C.

Figure 8:
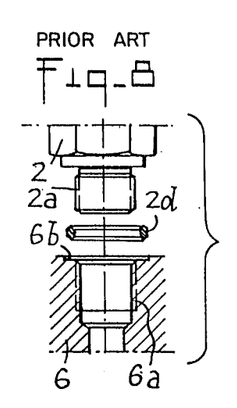
Figure 8A:
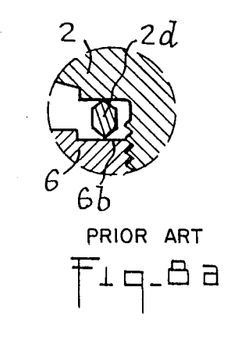

FIGS. 8 and 8a show a coupling identical to that of FIG. 2, in which only the seal is different. In this case, the seal presents a double knife edge 2d made of treated hard steel, which becomes incrusted, upon tightening, in the bearing faces of the coupling and the surface 6b. This cutting ring does not tolerate a fairly substantial out-of-square of the surface 6b, dismantling and reassembly of the seal, as it is virtually impossible, during screwing, to return the cutting edges into their first indentations, and this results in leaks.

Figure 9:
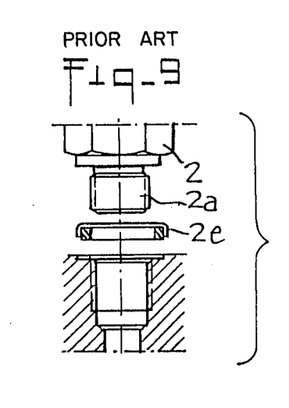
Figure 9A:
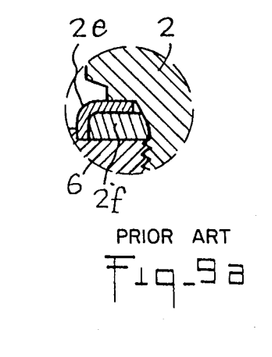

FIGS. 9 and 9a show a coupling and a cylindrical tapped hole identical to FIG. 2. Only the seal is different and it comprises a steel collar 2e lined with a rubber seal 2f. Theoretically, the rubber seal fills the collar completely, and only this collar, but, in actual fact, it is impossible to obtain a volume of rubber which is exactly sufficient. If the volume of rubber is insufficient, the collar is not filled up and a leak is produced. If there is too much rubber, the collar cannot imprison the whole of the seal which lifts the collar and is extruded, producing leaks.

The devices corresponding to FIGS. 1 to 8, which are the most used, do not, therefore, enable a reliable seal to be obtained and they all present important shortcomings. With these sealing devices, it must be understood that, even if the machinings and countersinks of the faces have been made with considerable care, with appropriate bits, nevertheless, the tapping which is often effected in stages, is often crooked and is out-of-square with the bearing faces of the apparatus. In fact, it is the tapping operation which causes serious defects and also the blows and scratches on the machined pieces during handling and transport.

The purpose of the gasket according to the invention is to obtain a perfect, long-lasting tightness for high pressure fluids, despite the presence of surface or out-of-square defects in coupling devices incorporating implantation in a tapped hole, as shown in FIGS. 1 to 9.

According to the present invention, the gasket comprises a hoop 14, 17, 20 made of hard, resistant material, bearing by one of its two faces against the wall 6b of the apparatus 6 and presenting a bore 14a, 14b, 17a, 17b, 20b in which are engaged, around the coupling 2, a sealing member 13, 16, 19 made of creepable, malleable material and a ring to be crimped, 12, 15, 18, made of ductile material having the form of a wedge in cross section, said ring 12, 15, 18 being crimped inside the hoop 14, 17, 20 during screwing of the coupling, so as to constitute a tight annular enclosure of variable volume in which is compressed the sealing member 13, 16, 19 which fills the annular space by creeping whilst the coupling is being screwed, said annular enclosure being defined by the coupling 2, the crimped ring 12, 15, 18, the hoop 14, 17, 20 and the face of the apparatus 6 of which the points of contact constitute means preventing extrusion of the sealing member 13, 16, 19, said hoop and said ring to be crimped being connected by means arranged on the gasket.

The main feature of the gasket according to the invention lies in the fact that it presents an assembly which is much higher than conventional seals, and that it forms with the coupling and the front face of the tapped hole an enclosure closed by points of contact constituting permanent anti-extrusion means, the variable volume of this enclosure being reduced during screwing of the coupling until the creepable seal member has completely filled said enclosure by creeping under high pressure.

The creepable material of which the seal member is composed fills all the interstices in the closed enclosure, the clearances of the thread, the defects, the scratches, the grooves, the chamfers and the housings. The coupling comes into blocking position at the end of compression of the creepable material constituting the seal member in the annular enclosure.

The device according to the invention is self-sealing, as the pressurized fluid which arrives through the thread can only compress the seal member further in its enclosure and increase tightness. This device which compensates all the surface and out-of-square defects is anti-vibratory and its braking prevents the coupling from unscrewing even with strong vibrations.

Finally, the gasket according to the invention may be dismantled and reassembled several times.

The seal members are constituted by materials which suit all the products used for hydraulic control and which allow use for numerous years and at least for the life-time of a modern machine.

These gaskets may be used for pressures of between 0 and 400 bars and their assembly with a closed enclosure does not undergo the conventional phenomenon of pumping due to the pressure cycles and to the wear resulting from this phenomenon.

The resistance of the seal member to a temperature of 100° C. does not raise any problem and it is possible to go beyond this tempoerature with appropriate materials.

These gaskets present no difficulty in assembly as it suffices to engage them by their small diameter on the body of the coupling which is screwed in the tapped hole. These gaskets are truly universal as they may ensure tightness of those threaded couplings most in use.

The invention will be more readily understood on reading the following description with reference to the accompanying drawings, in which:

FIGS. 1a to 9a are sectional views of the threaded couplings of FIGS. 1 to 9.

Figures 10, 11, 12, 13, 14, 15, 16, 17:
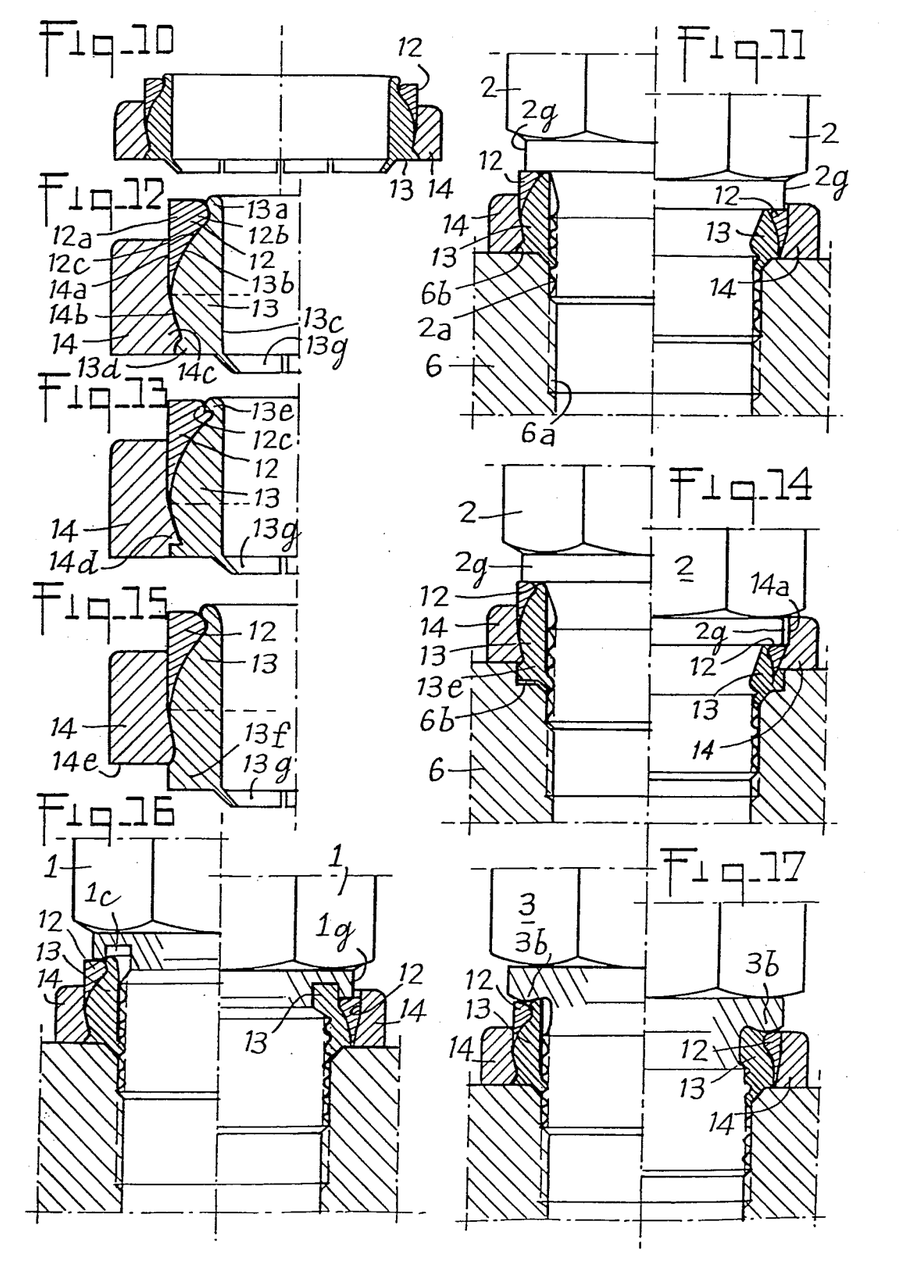
FIG. 10 is a view in elevation and in axial section of an embodiment of a gasket according to the invention.
FIG. 11 is a view in elevation and in section of the preceding mounted gasket before and after tightening on a coupling.
FIG. 12 is a half-view in section, on a larger scale, of the coupling shown in FIG. 10.
FIG. 13 is a half-view in section of a variant embodiment of the coupling shown in FIG. 12.
FIG. 14 is a view in elevation and in section of the assembly before and after tightening of a gasket on a coupling.
FIG. 15 is a half-view in section, on a larger scale, of the gasket shown in FIG. 14.
FIGS. 16 to 19 are views in elevation and in section of a gasket according to the invention mounted on different types of coupling.

Referring again to the drawings, FIG. 10 shows a gasket according to the invention, ready for use. This gasket comprises a hoop 14 constituted by a steel ring of large section and having undergone a treatment to increase the resistance thereof to stresses, a ring 12 of small section made of malleable metal, particularly annealed steel and adapted to be crimped in the hoop 14, a seal member 13 made of plastics material which is malleable and deformable, but not soft. The seal member may be made of any other material having the same qualities, such as soft metals, etc . . . which combine tenacity, deformability and creepability. These three elements are fast with one another, the hoop 14 and the ring 12 to be crimped being connected by the seal member 13.

FIGS. 11 and 12 show in greater detail the gasket of which the hoop 14 comprises a bore which presents at the entrance of the ring 12 a cylindrical part 14a extended by a conical part 14b and a rib 14c defining a circular groove on the side opposite the entrance.

In the cylindrical part 14a of the bore of the hoop 14 is disposed the ring 12 to be crimped which presents the form of a wedge in cross section and comprises a cylindrical outer surface 12a cooperating with the bore of the hoop and a concave spherical inner surface 12c, said ring being mounted in the bore of the hoop up to the conical part 14b. The seal member 13 is disposed inside the bore of the hoop and it maintains the ring 12 tight against said hoop, with the result that the spherical part 13b of the seal member follows the shape of the spherical surface 12c of the ring and that peripheral ribs 13a and 13d of the seal member 13 are engaged in corresponding housings in the hoop 14 and the ring 12. This arrangement allows the hoop 14 and the ring 12 to lock on the seal member 13 so as to constitute a manipulatable assembly having a cylindrical bore 13c made in the seal member.

On the side opposite the ring 12, the seal member 13 is provided with fine circular lips 13g which prevent back-to-front assembly on the threaded part 2a of the coupling, said lips 13g which easily engage in the thread of the coupling 2 prevent slide of the gasket and render it captive.

FIG. 11 shows in the left-hand half view a gasket mounted at the beginning of tightening on the threaded part 2a of a coupling 2 comprising a body having a flat face and of which the threaded part is screwed in a tapped hole 6a in an apparatus 6.

In this arrangement, it is visible that the coupling body 2, the ring 12, the hoop 14, the front face 6b of the tapped hole 6a of the apparatus, the threaded part 2a, define a closed annular enclosure enclosing the seal member 13.

When the coupling 2 is tightened by screwing the threaded part 2a in the tapped hole 6a, the tightening force is transmitted to the radial face of the ring 12 by the body 2, said ring, being driven in the conical part 14b of the hoop, is crimped radially, compressing the seal member 13 in the closed annular space defined hereinabove, as shown in the right-hand part of FIG. 11 which shows the gasket at the end of tightening. Axial penetration and radial crimping of the ring 12 produce a considerable reduction in the volume of the annular space in which is enclosed the seal member 13 which, by fluo-plastic deformation at high pressure, fills the enclosure up to its smallest housings.

During the whole period of screwing and deformation of the seal member, three points of contact are made under a very high pressure, which provide three means preventing extrusion of the seal member.

One of these anti-extrusion means is obtained during crimping of the ring 12 where a considerable tension is produced between the ring and the bearing face of the coupling 2, thus producing a contact under high pressure between the ring 12 and the body 2 preventing extrusion of the seal member 13. This contact between the ring and the body is produced during the whole screwing stroke and it is maintained upon total blockage.

Another anti-extrusion means is obtained by the effort of crimping of the ring 12 in the conical part 14b of the hoop 14 which provokes a resultant force applying the hoop 14 on the face 6b, this producing a point of contact preventing extrusion of the seal member 13 between the hoop 14 and the apparatus 6.

Finally, another anti-extrusion means is obtained by the high resistance to radial crimping of the ring 12 (FIG. 11) in the hoop 14, along the conical part 14b which produces a contact under a high pressure between the hoop 14 and the ring 12 and prevents the extrusion of the seal member 13 between these two elements. Upon total tightening of the coupling 2, the cylindrical collar 2g (FIG. 11) penetrates inside the hoop 14, which increases the screwing stroke and the reduction of the annular enclosure enclosing the seal member.

FIG. 13 shows another embodiment of the gasket in which ribs 13e on the seal 13 and 14d on the hoop are employed, which ensure an inseparable and irreversible locking of the seal 13 on the hoop 14 and the ring 12.

FIGS. 14 and 15 show a variant embodiment of the gasket shown in FIGS. 11 and 12, which provides that the seal member 13 presents, on the side opposite the ring 12 to be crimped, a ring 13f extending beyond the face 14e of the hoop 14 and adapted to fill an annular housing 6b in the apparatus 6, provided around the tapped hole 6a. The ring 12 often penetrates in the housing 6b, which further increases the stroke of screwing and reduction of the closed enclosure in which the seal member is disposed.

FIG. 16 shows a gasket identical to that of FIG. 10, but it is mounted on a coupling 1 and an apparatus, which are identical to those shown in FIG. 1. However, the coupling 1 presents, near its face bearing against the ring 12, an annular housing 1c which the seal member completely fills, as is shown in the right-hand half-view of FIG. 16 when the seal is in tightened position.

FIG. 17 shows the gasket of FIG. 10 mounted on the coupling and the apparatus of FIG. 3. In this case, the peripheral edge 3b constitutes the bearing member of the coupling which comes into contact with the ring 12 during tightening of the coupling and provokes crimping thereof in the hoop 14. It should be noted that the body 3 may possibly come into abutment on the hoop 14, slightly reducing the screwing stroke.

Figure 18:
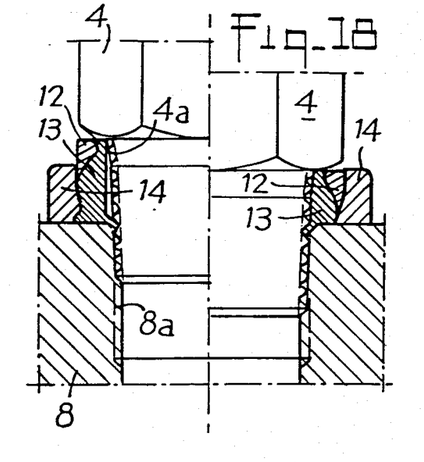

FIG. 18 shows the gasket of FIG. 10 mounted on the coupling and apparatus 8 of FIG. 4.

In this case, the thread 4a is conical and engaged in a cylindrical tapped hole 8a, so that the seal member 13 fills all the space between the conical thread and the cylindrical tapping. To obtain a good result, the enclosure must be well closed and there must be an efficient radial contact between the body 4 and the crimped ring 12.

Figure 19:
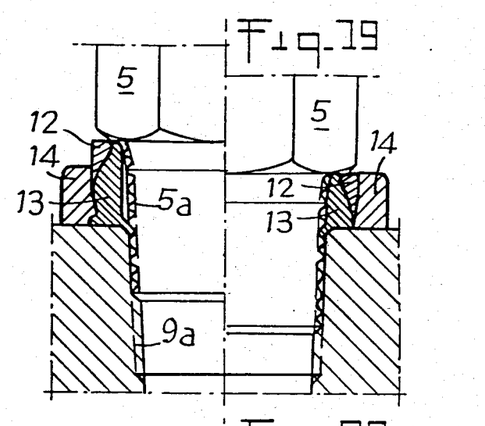

FIG. 19 shows the gasket of FIG. 10 mounted on the coupling 5 and apparatus 9 of FIG. 4. In this case, the threaded part 5a and the tapped hole 9a presenting conical threads, the seal member 13 fills not only the closed enclosure but also the space between the threads.

Figure 20:
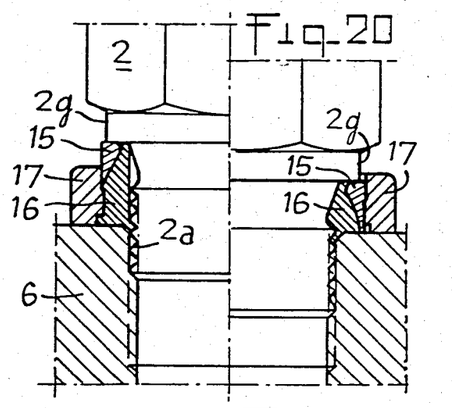
FIG. 20 is a view in elevation and in section of a coupling provided with another embodiment of a gasket.
Figure 21:
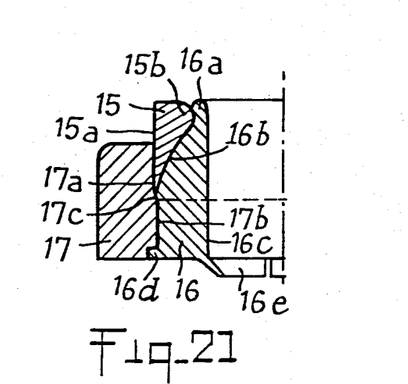
FIG. 21 is a half-view in section on a larger scale of the gasket shown in FIG. 20.

FIGS. 20 and 21 show a variant embodiment of the gasket in which the hoop 17 internally comprises two bores 17a, 17b connected together by a small conical part 17c. The bore 17a located towards the entrance of the ring 15 to be crimped presents a larger diameter than that located towards the apparatus 6.

Upon assembly of the gasket on the coupling 2, as shown in the left-hand half-view of FIG. 20, the ring 15 is engaged in the bore 17a of the hoop.

Figure 22:
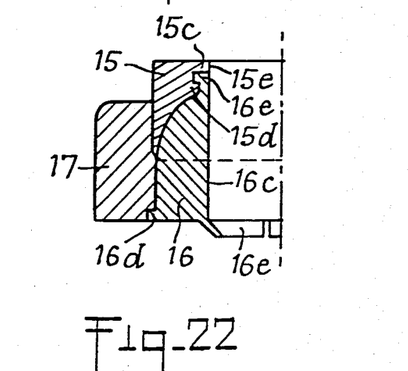
FIG. 22 is a half-view in section of another embodiment of a gasket.
Figure 23:
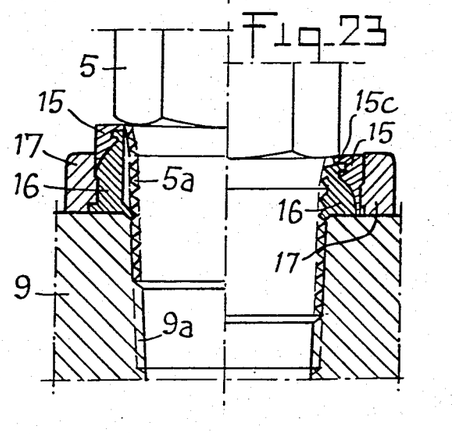
FIG. 23 is a view in elevation and in section of the gasket of FIG. 22 mounted on a coupling.

On tightening the coupling, the ring 15 is engaged under the axial effort in the bore 17b of smaller diameter so that the ring undergoes a radial crimping as in the case of hoop 14, forming a closed enclosure in which is compressed the seal member 16 as has been described hereinabove. FIGS. 22 and 23 show a variant of the gasket of FIG. 21 in which is used the smaller diameter of the ring 15 bearing on the coupling 5 which presents a very small bearing surface.

In this case, the ring 15 to be crimped presents an increase in its bearing surface towards the interior and it presents an inner diameter 15e which is equal to the inner diameter 16c of the seal member. The three elements 15, 16, 17 are locked to form one assembly by ribs 16d, 15d and 16e.

After crimping of ring 15 in the right-hand half-view of FIG. 23, part 15c bears on the coupling body 5 and auto-extrusion is thus effected, if necessary taking into account the shape of the body 5.

Figure 24:
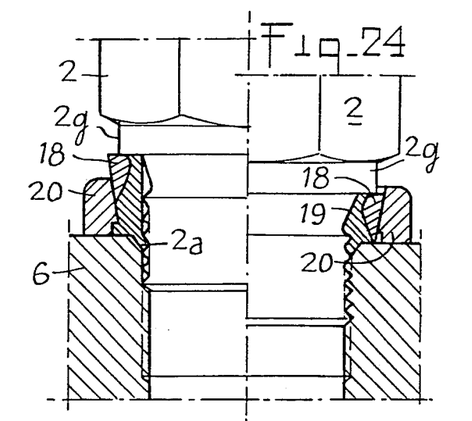
FIG. 24 is a view in elevation and in section of the assembly of another embodiment of gasket on a coupling.
Figure 25:
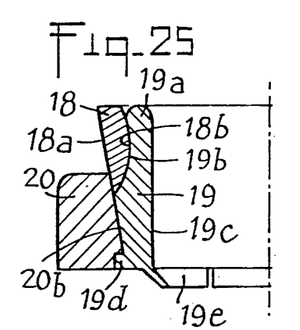
FIG. 25 is a half-view in section on a larger scale of the gasket shown in FIG. 24.

FIGS. 24 and 25 show a variant embodiment of the gasket in which the hoop 20 presents a conical bore 20b and the ring 18 to be crimped, of wedge-shaped cross section, presents on the outside a conical surface 18a in contact with the bore 20b, said ring presenting a convex spherical inner surface 18a in the form of a diabolo cooperating with the outer face 19b of the seal member 18 for locking thereof. As shown in FIG. 24, the gasket being mounted on a coupling shown in FIG. 2, the coupling is screwed so that the body pushes the ring 18 into the conical bore 20b in the hoop where said ring is crimped radially as screwing progresses until the closed enclosure containing the seal member 19 is entirely filled with the material constituting said member and the coupling is in blocking position.

Figure 26:
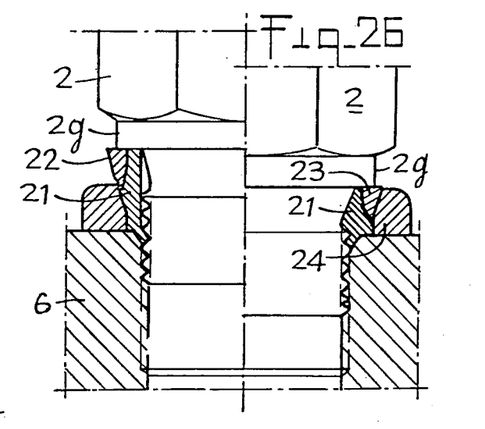
FIG. 26 is a view in elevation and in section of the assembly of another embodiment of a gasket on a coupling.
Figure 27:
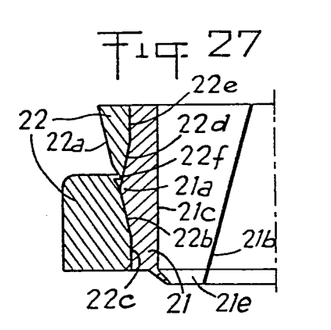
FIG. 27 is a half-view in section on a larger scale of the gasket /shown in FIG. 26.

FIGS. 26 and 27 show a variant of the gasket shown in FIGS. 24 and 25. However, this gasket comprises, before tightening, two pieces instead of three pieces as in the preceding gaskets.

To this end, the hoop and the ring to be crimped are made in one machine-made piece 22, in steel or other metal. The hoop and the ring are connected by a thin annular part 22f adapted to break during screwing of the coupling 2, so as to obtain a hoop 24 and a ring 23 as shown in the right-hand half-view of FIG. 26. Crimping of the ring 18 and tightening by compression of the seal member 21 in the closed enclosure are effected as before. The seal member 21 optionally presents in that case an inclined slot 21b to facilitate assembly in the ring 22.

Figure 28:
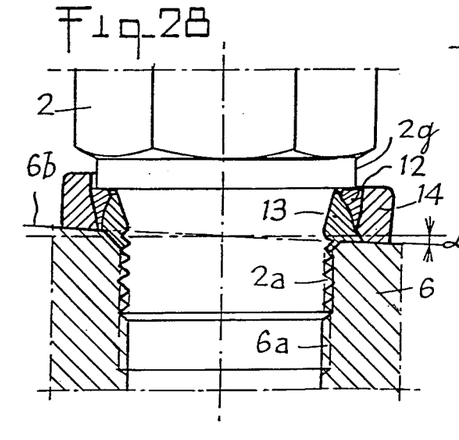
FIG. 28 is a view in elevation and in section of the assembly of a gasket on an apparatus presenting an out-of-square face.

FIG. 28 shows the possibility of hermetically mounting a connecting member in a tapped hole in an apparatus of which one bearing face is not square in the case of FIG. 2, but it is obvious that this may be applied to the couplings shown in FIGS. 1 to 9.

As may be clearly seen in FIG. 28, the bearing face 6b of the hoop 14 is out-of-square (angle α) and in that case the ring 12 during crimping is deformed to compensate the inclination, whilst remaining in abutment on the body of the coupling 2 and maintaining the hoop 14 in abutment with force on the inclined face 6b. In this way, tightness of the closed enclosure of degressive variable volume is perfectly ensured by the three anti-extrusion means made without difficulty. The spherical form of the ring 12 used and the spherical form of the seal member 13 facilitate the out-of-square bearing surface.

Figure 29:
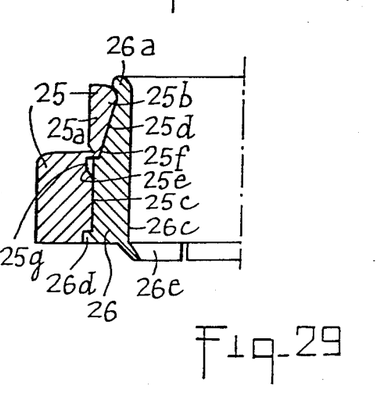
FIG. 29 is a half-view of another embodiment of a gasket.

FIG. 29 shows a variant of the gasket of FIG. 21 in which the metal pieces 25 are machine-made in one piece, with a thin annular part 25f adapted to be broken upon tightening of the coupling in order to release the ring 12 which is then crimped exactly in the same way as described hereinabove and shown in FIG. 20. The gaskets with tight enclosure of variable volume and comprising three anti-extrusion means described hereinabove therefore provide a highly reliable tightness under the worst surface and squaring conditions, by compensating all the machining defects and all the inevitable scratches resulting from handling and storage.

The present invention finds application in all domains where fluids are used under high pressures from 0 to 400 bars and in particular in the hydraulic control of machines.

This coupling provided with its gasket is used in machine tools, transfer machines, robots, agricultural tractors, hoisting apparatus, cranes, power shovels, building and public works.

The chemical industry is a particularly interesting domain since, with chemically inert gaskets, tightness can be ensured without risk whatever the conditions, and with dangerous fluids.

The invention is, of course, not limiting and the man skilled in the art may make modifications thereto without departing from the scope thereof.

What is claimed is:

1. In a gasket disposed between a coupling for pipes in which high pressure fluid circulates and an apparatus presenting a tapped hole in which the threaded part of the coupling is screwed, the gasket comprises a hoop made of hard, resistant material, being by one of its two faces against the wall of the apparatus and presenting a bore in which are engaged, around the coupling, a sealing member made of creepable, malleable material and a ring to be crimped, made of ductile material having the form of a wedge in cross section, said ring being crimped inside the hoop during screwing of the coupling, so as to constitute a tight annular enclosure of variable volume in which is compressed the seal member which fills the annular space by creeping whilst the coupling is being screwed, said annular enclosure being defined by the coupling, the crimped ring, the hoop and the face of the apparatus of which the points of contact constitute means preventing extrusion of the seal member, said hoop and said ring to be crimped being connected by means arranged on the gasket.

2. The gasket of claim 1, wherein the hoop comprises a bore which presents at the entrance of the ring to be crimped a cylindrical part followed by a conical part.

3. The gasket of claim 1, wherein the hoop comprises two bores of different diameters connected together by a conical part, the bore of larger diameter being located towards the entrance of the ring to be crimped.

4. The gasket of claim 1, wherein the hoop presents a conical bore over the whole of its height of which the largest diameter is located towards the entrance of the ring to be crimped.

5. The gasket of any one of claims 1 to 3, wherein the ring to be crimped, of wedge-shaped cross section, presents a cylindrical outer surface cooperating with the bore of the hoop and a concave spherical internal surface following the shape of a corresponding surface of the seal member.

6. The gasket of either one of claims 1 and 4, wherein the ring to be crimped of wedge-shaped cross section presents a conical outer surface cooperating with the bore of the hoop and a convex spherical inner surface in the form of a diabolo cooperating with the outer face of the seal member.

7. The gasket of either one of claims 1 or 2, wherein the ring to be crimped being in contact as soon as it enters the hoop with the conical part of the bore, it undergoes, upon screwing of the coupling along an axial stroke at least equal to the height of said conical part, a crimping bringing about a contact under tension with the hoop constituting a means preventing extrusion of the seal member between the hoop and the crimped ring.

8. The gasket of claim 1, wherein the ring to be crimped undergoes, during screwing of the coupling along an axial stroke at least equal to the height of the conical part of the hoop, a crimping which brings about a contact under tension with the coupling body constituting a means preventing extrusion of the seal member between the coupling body and the crimped ring.

9. The gasket of claim 8, wherein the ring to be crimped undergoes, upon screwing of the coupling along an axial stroke at least equal to the height of the conical part of the hoop, a crimping, bringing about a contact under tension with the body of the coupling constituting a means preventing extrusion of the seal member between the apparatus and the hoop.

10. The gasket of claim 1, wherein the ring to be crimped and the hoop are made in one piece, said ring and the hoop being connected together by a thin annular part adapted to break when the coupling is screwed, so as to obtain a separate hoop and ring.

11. The gasket of claim 1, wherein the ring is crimped in the axis of the coupling body and said ring, by its reaction to crimping, holds the hoop flat in close contact with the face of the apparatus, although the face is out-of-square (angle $\alpha$) with respect to the axis of the tapped hole, said ring of wedge-shaped cross section being crimped askew by reason of its easy deformation in the hoop.

12. The gasket of claim 1, wherein the hoop, the ring to be crimped and the seal member are connected by locking the seal member by force by means of hooking members in under-cut with positive reversible fastening, the seal member being annular and continuous or presenting a single longitudinal slot.

13. The gasket of claim 1, wherein the seal member presents towards its face in contact with the apparatus a ring extending beyond the face of the hoop and adapted to fill a complementary housing provided in the apparatus.

14. The gasket of claim 1, wherein the ring to be crimped, the hoop and the seal member are connected by moulding of the seal member in a mould containing the ring to be crimped and the hoop which form captive inserts of the seal member.

15. The gasket of claim 1, wherein the seal member presents towards its face in contact with the apparatus thin lips indicating the direction of assembly of the seal, said lips being engaged in the thread of the coupling rendering said seal captive as soon as it is mounted on the coupling.

16. The gasket of claim 1, wherein the same complete seal, placed on a threaded body of the same or very similar diameters, fills the annular enclosure by creeping of the seal member, the shapes and the volume of the annular enclosure being different, the compensations in shape and volume of said tight enclosure being obtained by blocking the seal at different heights.

* * * * *